United States Patent [19]

Kochanski

[11] Patent Number: 5,512,934
[45] Date of Patent: Apr. 30, 1996

[54] SYSTEM AND METHOD FOR TRANSMISSION OF PROGRAMMING ON DEMAND

[75] Inventor: Gregory P. Kochanski, Dunellen, N.J.

[73] Assignee: AT&T Corp., Murray Hill, N.J.

[21] Appl. No.: 365,645

[22] Filed: Dec. 29, 1994

[51] Int. Cl.$^6$ .................................................. H04N 7/173
[52] U.S. Cl. .................... 348/7; 348/13; 348/12; 455/4.2
[58] Field of Search ................... 348/7, 6, 8, 12, 348/13; 455/3.1, 5.1, 4.2, 6.1; H04N 7/16, 7/173

[56] References Cited

U.S. PATENT DOCUMENTS

| 4,816,905 | 3/1989 | Tweedy et al. | 348/7 |
|---|---|---|---|
| 5,168,353 | 12/1992 | Walker et al. | 348/7 |
| 5,172,413 | 12/1992 | Bradley et al. | 348/7 |
| 5,285,272 | 2/1994 | Bradley et al. | 348/7 |
| 5,323,234 | 6/1994 | Kawasaki | 455/4.2 |
| 5,339,315 | 8/1994 | Maeda et al. | 348/7 |
| 5,357,276 | 10/1994 | Banker et al. | 348/7 |
| 5,367,330 | 11/1994 | Haave et al. | 348/7 |
| 5,414,455 | 5/1995 | Hooper et al. | 348/7 |
| 5,416,508 | 5/1995 | Sakuma et al. | 348/7 |
| 5,446,490 | 8/1995 | Blahut et al. | 348/7 |

OTHER PUBLICATIONS

VCTV: A Video–On—Demand Market Test—by Allen, Heltai, Koenig, Snow and Watson AT&T Technical Journal, Jan./Feb. 1993.

*Primary Examiner*—Safet Metjahic
*Assistant Examiner*—Chris Grant

[57] ABSTRACT

A method and system for providing programming on demand service to television subscribers. In a preferred embodiment, each group of viewers that requests a given program is coupled to a separate video "feed" of the program. Each individual feed shows the program at a different rate. In this manner a second group of viewers who begin viewing a program after a first group of viewers may "catch up" to the first group. Whenever such an "intersection" occurs, the groups are merged and view the remainder of the movie on a single feed. In this manner the total number of feeds to required to provide video on demand service to a large number of viewers is reduced.

11 Claims, 4 Drawing Sheets

SYSTEM AND METHOD FOR TRANSMISSION OF PROGRAMMING ON DEMAND

TECHNICAL FIELD

This invention relates to the transmission of signals over electronic media, and more particularly to the transmission of video and audio programming on demand.

BACKGROUND OF THE INVENTION

The differences between programming on demand service and traditional programming service are well illustrated in the comparison of video on demand service to traditional broadcast television service.

Video on demand service allows each television viewer, or "subscriber" to see a program they want whenever they want to see it. This stands in contrast to traditional broadcast television service which requires each viewer to select from a list of programs that are to be shown at a predetermined time. While video on demand service offers viewers greater selectivity than traditional television service, it poses a significant problem to service providers. The required number of video playback paths, or "video feeds" required in a video on demand system is significantly greater than the number of feeds required in a traditional system.

In current video on demand systems, a separate video feed is required to service each viewer. This is clearly illustrated in the case of two viewers who want to watch the same program but would like to begin watching it at different times. Consider a first viewer who begins watching a program 10 minutes before a second viewer. The second viewer can not begin viewing the program on the same feed as the first viewer because this would cause the second viewer to miss the first 10 minutes of the program. Thus, to provide "true video on demand" the number of feeds must be equal to the number of viewers.

FIG. 1 shows a comparison of a prior video on demand system to a traditional cable television system. As can be seen from the figure, the traditional system requires only one feed, feed 100, to service five households 102a–e, while the prior video on demand system requires five feeds 110a–e to service five households 112a–e. Each "feed" may be thought of as video playback device and a coupling associated with that device for delivering the device's output to a viewer's television set. Examples of video players include: Video Cassette Recorders, laser disk players, and digital playback devices. Examples of couplings suitable for use with such playback devices are: coaxial cables, fiber optic cables, twisted shielded pair cables, and wireless links.

Referring further to FIG. 1, it can be seen that a transmission center for the traditional system 104 includes a video player 116 and a transmission device 108. By contrast, a transmission center for the prior video on demand system 114 includes five video players 116a–e and a transmission and switching device 118, the switching device being necessary to couple each of the feeds to the appropriate player.

The one feed per viewer requirement of prior video on demand systems places a greater hardware burden on both the providers of programs and the operators of the networks over which those programs are transmitted. The amount of hardware necessary to implement prior video on demand systems effectively multiplies the amount of hardware needed to provide programming service by the number of viewers. The attendant costs of maintaining that additional hardware is correspondingly increased. Furthermore, the simultaneous transmission of numerous versions of a program over a network requires more channel capacity than does the transmission of a single version of the same program, and therefore places a greater burden on network resources. The increased burden that video on demand service places on program providers and networks, and the accompanying increased costs, can be reduced if the number of required feeds can be reduced.

Attempts have been made to reduce the number of feeds needed to provide video on demand service. One method is to implement a compromise between true video on demand and traditional broadcast television. If viewers are willing to wait up to $\tau$ seconds for a program to begin, a program of length T can be distributed using $T/\tau$ feeds, regardless of the number of viewers who request the program. This method is analogous to broadcasting the program in the traditional manner every $\tau$ seconds. However, even if viewers are willing to wait some time for their program to begin, they are likely to prefer smaller waiting times when given a choice. Therefore, in an environment where several service providers are offering video on demand, viewers are most likely to subscribe to the provider that offers the smallest waiting time. Thus, competition for subscribers dictates that service providers minimize waiting times.

SUMMARY OF THE INVENTION

The problems associated with the prior methods of implementing video on demand are overcome by the present invention. By using the present invention the number of feeds required in a video on demand system may be reduced without an accompanying increase in waiting time.

The number of feeds is reduced by switching viewers among two or more feeds that show a given program at different rates. When a first viewer requests a program, that viewer's television set is coupled to a first feed and the first viewer progresses through the program at a rate associated with the first feed. Thereafter, when a second viewer requests the same program as the first viewer, the second viewer is coupled to a second feed and the second viewer progresses through the program at a rate associated with the second feed. In this manner, the second viewer may "catch up" to the first viewer if the second viewer is coupled to a feed that is faster than the feed to which the first viewer is coupled. When such an "intersection" occurs, the two viewers are "clumped" together. That is, one of the viewers is switched to the other viewer's feed so that the two viewers are served by one feed for the remainder of the program.

Subsequent viewers requesting the same program as the first two viewers are coupled to either the first feed, second feed, or one or more additional feeds of varying rates, and the clumping process repeats, eventually leading to one feed servicing a large number of viewers. Accordingly, the number of feeds required to service all of the viewers is somewhat less than the total number of viewers, thereby allowing for a reduction in the number of feeds required to provide video on demand service.

DETAILED DESCRIPTION

Figure 1:
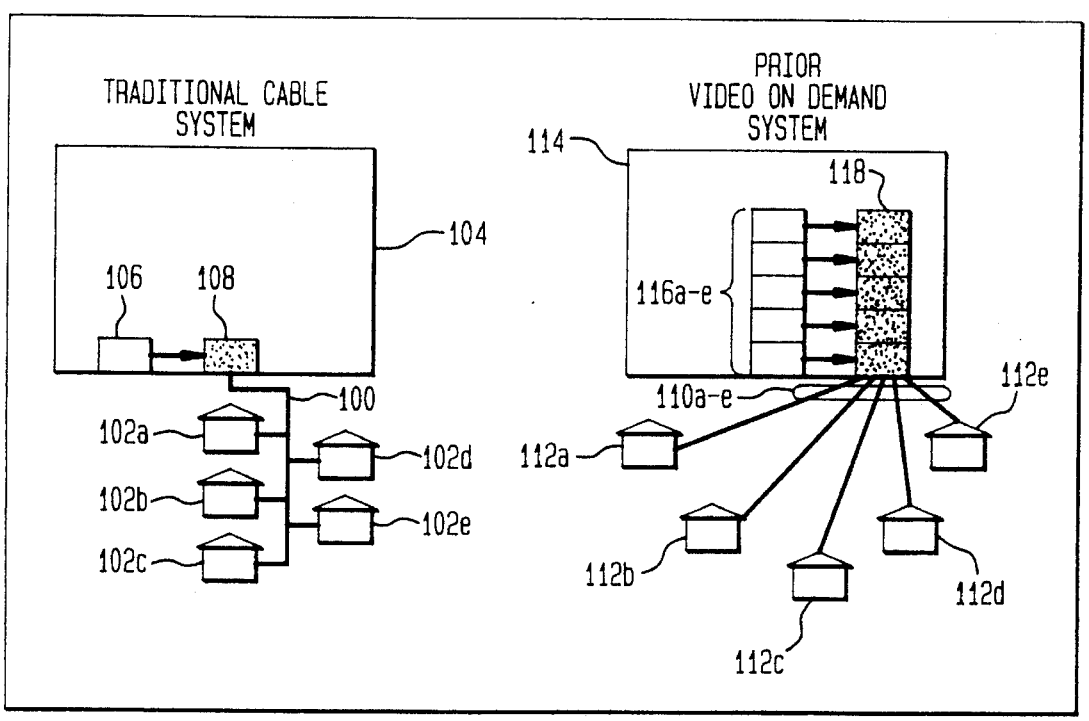
FIG. 1 is an abstract comparison of a traditional cable television system to a prior video on demand system.

Full length movies will be the subject of the discussion since they are a common selection among subscribers to a programming service. Although the invention is described as it applies to full length movies, it will be appreciated by those of ordinary skill in the art that the invention may be applied to the transmission of audio signals without accompanying video (such as those currently broadcast by commercial radio stations), or any other type of prerecorded programming.

The advantages of the present invention are realized by varying the rate at which viewers watch a movie. Accordingly, one must consider how much a movie's rate might be changed without viewers noticing the difference. First, movies can often be shortened naturally at scene changes. A person could examine each scene change, and mark how much (if any) could be unnoticeably clipped. Similarly, a few scene changes might lend themselves to natural extension, by duplication of static, or nearly static, images. Eventually, movies could be produced with marks for this purpose, assigned by the original director and producer. Until then, one hopes that such trimming is carried out with some degree of artistic judgement.

Most movies contain frequent scene changes, such changes commonly occurring at 10 second intervals. Since one could reasonably expect to trim 1–2 times human reaction times off each scene change (e.g. 100–300 ms), occasionally whole seconds, and sometimes longer, the average movie rate could be varied by $\delta > 2\%$ through the use of scene trimming.

Further rate modification can be obtained through the use of digital interpolation techniques. One technique is to take a sequence of N frames of a movie (e.g. 20 frames) and interpolate to a sequence of N+1 frames (e.g. 21 frames), lengthening the movie by one frame for each such interpolation. Likewise, a movie may be shortened by interpolating a sequence of N frames down to N−1 frames. As in the case of scene change trimming, there may be times when interpolation is noticeable, such as in a smooth pan or slow zoom. Even so, it seems likely that a 10% change would be acceptable in some substantial fraction of a typical movie, thereby allowing for an additional 2–3% contribution to $\delta$. Thus, it seems that through the use of scene change trimming and interpolation a $\delta = 0.05$ is likely to be unnoticeable.

In addition to choosing a method by which to modify the video signal, one must choose a method to modify the accompanying audio signal. The audio signal must be sped up or slowed down to stay in sync with the modified video. Audio signals may be sped up or slowed down without frequency shifting by fairly simple techniques, and therefore should not place any limits on the achievable $\delta$ of 0.05.

An audio signal can be sped up (or "shrunk") by a factor of two while maintaining intelligibility by skipping short sections of the tape. Conversely, the signal can be slowed down (or "stretched") by using a tape recorder with a rotating set of heads to repetitively play short (tens of milliseconds) sections of the signal. In any event, a 10% speed change is likely to be unnoticeable, at least on an isolated speech segment. Global considerations, such as music with a strong and periodic beat, could put strict limits on rate modification, as the beginning and end of a rate change would be annoyingly audible, but such sections could be easily avoided. As in the case of the video signal, some aesthetic sensitivity is required to decide how much rate change is acceptable at different points in a movie.

Once a suitable rate changing scheme has been chosen, it may be applied in a video on demand system that incorporates the present invention. The operational characteristics of such a system will be described with references to the timeline pictured in FIG. 2.

Figure 2:
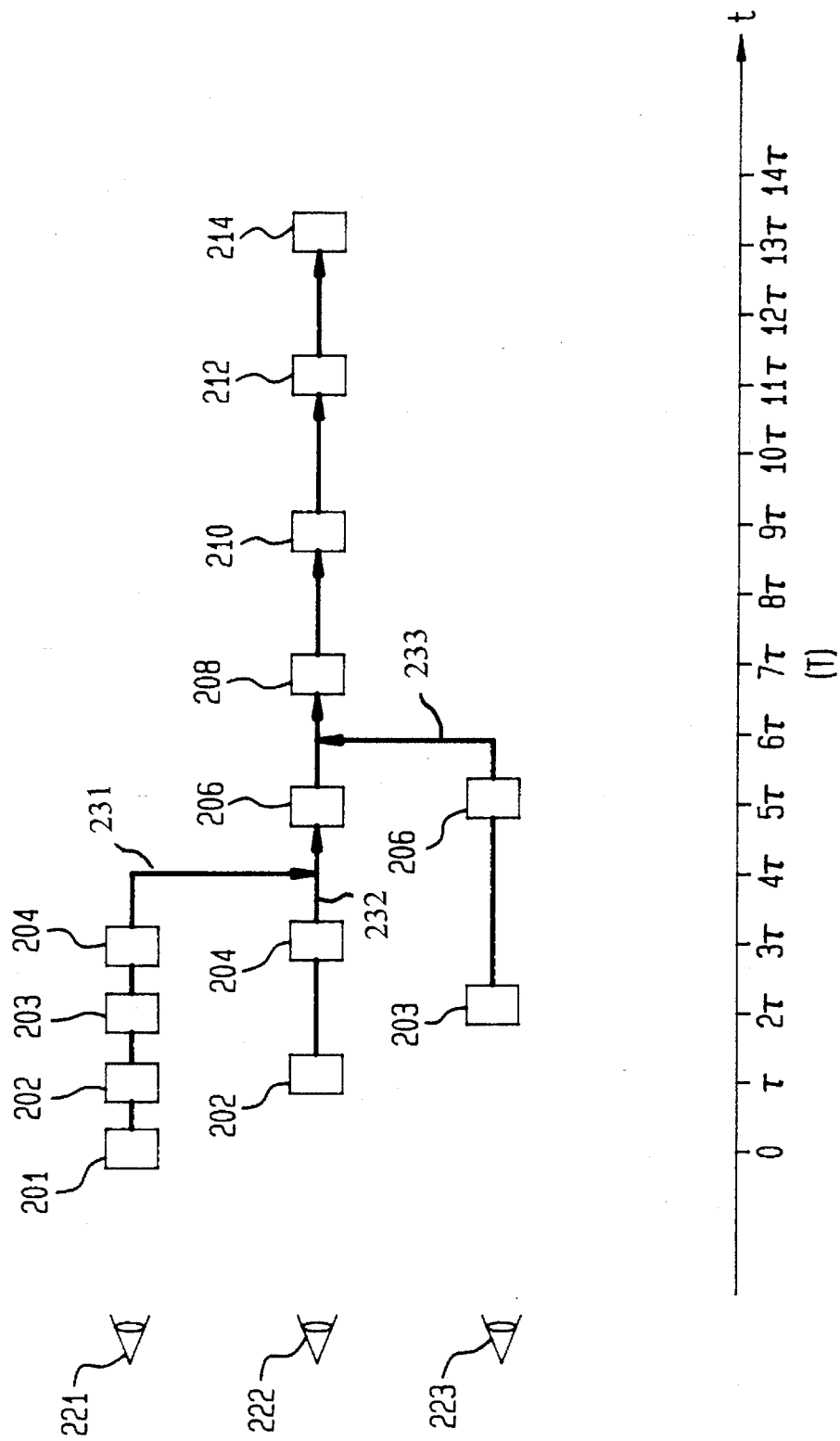
FIG. 2 is a time line representation of how the number of video feeds required to service three viewers can be reduced from 3 to 1 by merging viewers according to the present invention.

FIG. 2 shows a sequence of frames of a movie 201–204, 206, 208, 210, 212, 214, as they appear to three viewers 221, 222 and 223, over three video feeds 231, 232 and 233, respectively. The t axis in the figure represents the progression of each viewer through the movie in increments of $\tau$ seconds. For purposes of illustration, the movie length (T) is taken to be equal to $14\tau$, and the three viewers, viewers 221, 222 and 223, are said to begin watching the movie at t=0s, t=$\tau$s, and t=$2\tau$s, respectively. Also for purposes of illustration, viewers 222 and 223 do not begin viewing the movie at frame 201, but rather, the first frame seen by viewer 221 is frame 201, while the first frame seen by viewer 222 is frame 202, and by viewer 223, frame 203.

As can be seen from FIG. 2, viewer 221, viewing the movie on feed 231, begins by seeing every frame of the movie. Feed 232 moves at a faster rate, supplying every other frame to viewer 222. Feed 233 moves still faster, supplying only every third frame to viewer 223. Given this combination of rates along with each viewer's beginning time, viewer 222 catches up to viewer 221 by frame 204 of the movie. Viewer 221 is then switched over to feed 232 and watches the remainder of the movie on this feed along with viewer 221. Similarly, viewer 223 catches up to viewers 221 and 222 by frame 206, and is also switched over to feed 232. Thus, by frame 208 the number of feeds required to service the three viewers has been reduced from three to one.

In practice a video on demand system is likely to be used by more than three viewers and the time of viewer requests is likely to vary widely. It may therefore be beneficial to exercise some intelligence in deciding which feed a viewer (or clump of viewers) should be coupled to. There are a number of simple algorithms that may be invoked to make such decisions. Perhaps the simplest is merely to move each clump toward its nearest neighbor. More complex algorithms can put some weight on next-nearest neighbors, or can allow for long range interactions between clumps of viewers. In general, one would want to consider long range interactions, as a simple towards-nearest-neighbor approach does not take into account what might happen after the immediate merge. Further refinements could include weighting the clumps, so that heavily populated clumps would be switched to the "unmodified feed". Such an algorithm would tend to give most viewers an unmodified (and presumably better) viewing experience. In any event, use of a clumping algorithm is likely to further reduce the required number of feeds.

In the relatively simple video on demand system discussed in relation to FIG. 2, the reduction in the number of feeds that can be realized through the invention is readily apparent. However, computing the reduction in the number of feeds in a more complex system requires the use of a mathematical model.

By assigning a value to certain parameters the development of a mathematical model of a video on demand system is simplified. In the present case, since a common type of video on demand offering is full length movies, a model is developed under the assumption that this is the only type of program offered and that each such program has a length of $T=10^4$s. Furthermore, it is assumed that viewers would be content to wait a period of $\tau=3$s following their request for their movie to begin. In addition, it is assumed that the number of viewers is highly variable, taking on values from 1 to perhaps $10^7$ for well publicized events. Finally, in video on demand systems which allow a viewer to pause a movie, it is assumed that: viewers would again tolerate a $\tau=3$s period following their request to resume, the mean length of time between pauses is $T_p=10^3$s, pauses occur randomly, and pauses have random lengths greater than $\tau$.

Figure 3:
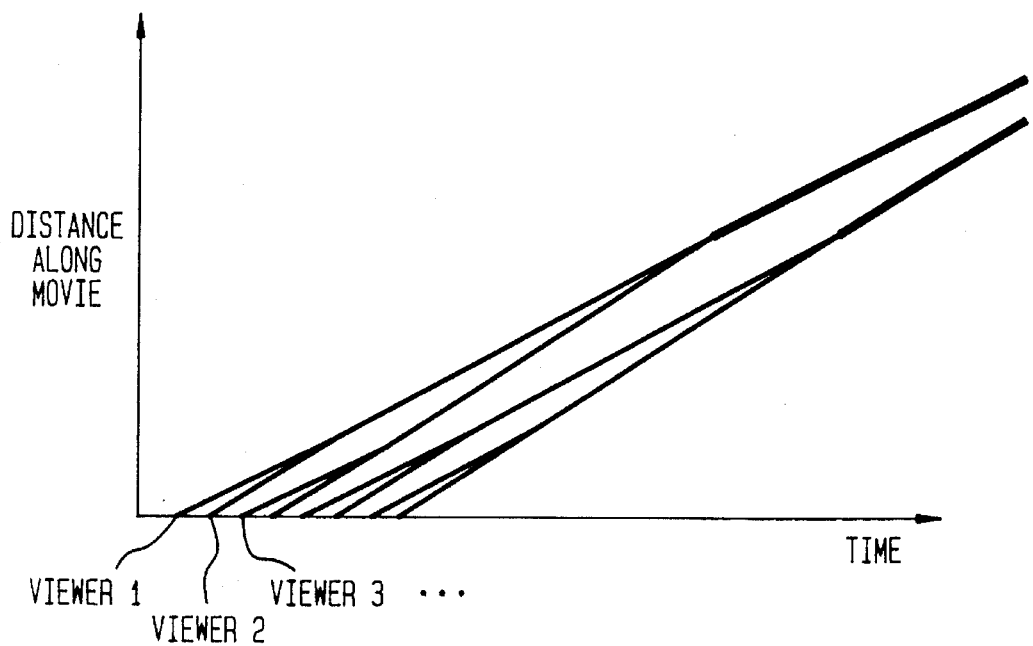
FIG. 3 is a graph depicting several levels of viewer merging that may occur in a video on demand system using the present invention.

To begin, consider the simple case of viewers who never touch the pause button. Clumps of viewers enter the beginning of the movie every $\tau$ seconds, and the system begins to merge them by speeding up a clump that has just entered, and slowing down its upstream neighbor. In FIG. 3 a graph depicting several levels of merging is shown.

The $n^{th}$ merge occurs at intervals of $$\left(\frac{\tau}{2\delta}\right) \cdot 2^{(n-1)},$$

for a total number of feeds required in a movie of approximately $$\left(\frac{1}{\delta}\right)\left(1 - \frac{1}{\left(1 + 2\delta\frac{T}{\tau}\right)}\right).$$

For the present case, one would need about 20 feeds, almost two orders of magnitude fewer than the brute-force approach with $T/\tau$ feeds. Another way of looking at the result is to consider that if there are more than about 20 viewers for a given movie, merging feeds will result in a substantial reduction in the number of feeds required.

Now, giving users a pause key will reduce that dramatic improvement. A member of a clump, after a pause, will generally land in the middle of nowhere, and will force the creation of a new clump. It is conservative to assume that pauses start and end randomly.

A system incorporating pause keys is modeled by writing a function describing the distribution of viewers along the length of the movie. A differential equation describes how the viewer distribution changes with time (for instance, viewers disappear and reappear as they hit their pause key). The model is, for simplicity, evaluated at it's steady state (after a long time, when the distribution of viewers has settled down). This is, of course, an approximation, as there really isn't a constant supply of people wanting to watch a certain movie, but this approximation captures the essential concepts, and allows for easy analytic solution. In practice, where one knew more about how many people would request a particular movie at a given time, one would run a computer simulation of the system to get exact results.

Clumps of viewers are distributed throughout the movie, generally far apart (several times $\tau$), but occasionally very close—just before a merger happens. The average behavior of the slots is described by a probability density of slots, $\rho(t)$, representing the average number of slots in 1 second movie.

One can then consider clumps as diffusing around, and merging when they collide with one another. The appropriate equation for $\rho$ (without pause keys) is then $\dot\rho = -c\rho^2$. However, this proves to be incorrect. It leads to a total number of clumps that diverges logarithmically in the limit of an infinitely long movie (rather than the correct asymptotic approach to a constant), and it assumes random diffusion motion of clumps.

In a preferred embodiment, the motion of clumps is not diffusive. As FIG. 3 shows, the motion of clumps can be organized to bring them together with their neighbors in an efficient manner. In fact the equation to give the correct number of slots for all the merge times is $$\dot\rho = -2\delta\left(\frac{\tau}{2}\right)^{1/2} \rho^{3/2}, \text{ with } \rho = \frac{2}{\tau} \text{ at } t=0.$$

This simple model has the solution $$\rho = \frac{2}{\tau}\left(1 + \delta\left(\frac{\tau}{2}\right)^{1/2} t\right)^{-2}.$$

Now, pause terms need to be added. On average, there are $T/T_p$ pauses per viewer in a movie, or a total of $NT/T_p$ pause key activations, where N is the number of viewers. The number of activations per unit time is then $N/T_p$. Each pause, if it can occur randomly anywhere in the movie, contributes a uniform probability density $\Delta\rho=1/T$, so the rate of change of density becomes $R=N/(TT_p)$. Of course, activation of a pause key doesn't necessarily destroy a clump—it only changes the number of clumps if there is exactly one viewer in the clump. The probability that pause activation destroys a clump may be estimated by assuming that the number of viewers in a clump is described by a Poisson distribution, with a mean equal to the mean number of viewers in a clump: $n_c=N/(T\rho)$ (assuming viewers are uniformly distributed along the length of the movie). Accordingly, the probability that pause activation destroys a clump is seen to be $$D = \left(\frac{N}{T\rho}\right) e^{-N/(T\rho)}.$$

Similarly, the end of a pause doesn't necessarily create a new clump—it does so only if there are no clumps in the next $\tau$ seconds. This clump creation probability can be evaluated under the same assumptions to be $C=e^{-\rho\tau}$. It should be noted that the assumption used here is the most conservative possible—anything other than a uniform distribution of viewers ending pauses makes it easier to re-clump them, and will make this technique more useful.

It is now possible to write a full equation for the change in the clump density:

$$\dot\rho = -2\delta\left(\frac{\tau}{2}\right)^{1/2} \rho^{3/2} + R(C-D), \text{ or } \dot\rho =$$

$$-2\delta\left(\frac{\tau}{2}\right)^{1/2} \rho^{3/2} + \left(\frac{N}{TT_p}\right) \cdot \left(e^{-\rho\tau} - \left(\frac{N}{T\rho}\right) e^{-N/(T\rho)}\right).$$

This equation can be solved easily by noting that in the region of interest—where the viewers are well clumped—there are many viewers in each clump, so D is small, and clumps are widely spaced, so C is near unity. Within its range of validity, then, the steady-state clump density is given by $$\rho_s^{3/2} = \frac{N}{(2^{1/2}TT_p\delta\tau^{1/2})} \text{ (if } \tau\rho_s \ll 1, \text{ and } n_c \gg 1).$$

With extremely large numbers of viewers, there are so many pauses that no sooner does the system manage to clump some viewers together than a new clump must be created to service a viewer who is ending a pause. Both of these limits are apparent in the calculation.

An upper limit on the number of viewers can be established by comparing $\rho_s$ to $\tau^{-1}$, the density of clumps in a fully saturated system. Clumping viewers is advantageous for $$N < N_{max} = \frac{2^{1/2} T T_p \delta}{\tau},$$

where for typical values, $N_{max} = 2 \cdot 10^5$ viewers, a number large enough for all purposes, except perhaps the most popular first run movies or presidential debates.

The lower limit is obtained by comparing $\rho_s$ to the density of clumps, assuming one viewer per clump: N/T. Clumping is seen to be advantageous for $$N > N_{min} = \frac{T}{2 T_p^2 \delta^2 \tau}.$$

Again, with typical values, $N_{min} = 5$.

In an intermediate case, with $N = 10^3$, the steady-state density of clumps is $\rho_s = 8.7 \cdot 10^{-3} \cdot s^{-1}$, or one clump every 114 seconds. This result is an order of magnitude improvement on the one feed per 11 seconds that would be required without clumping.

In sum, for video on demand systems with $10-10^5$ viewers watching a movie at the same time, the required number of feeds can be dramatically reduced, and therefore the amount of hardware needed to provide video on demand service and the attendant costs of that hardware can also be reduced.

Figure 4:
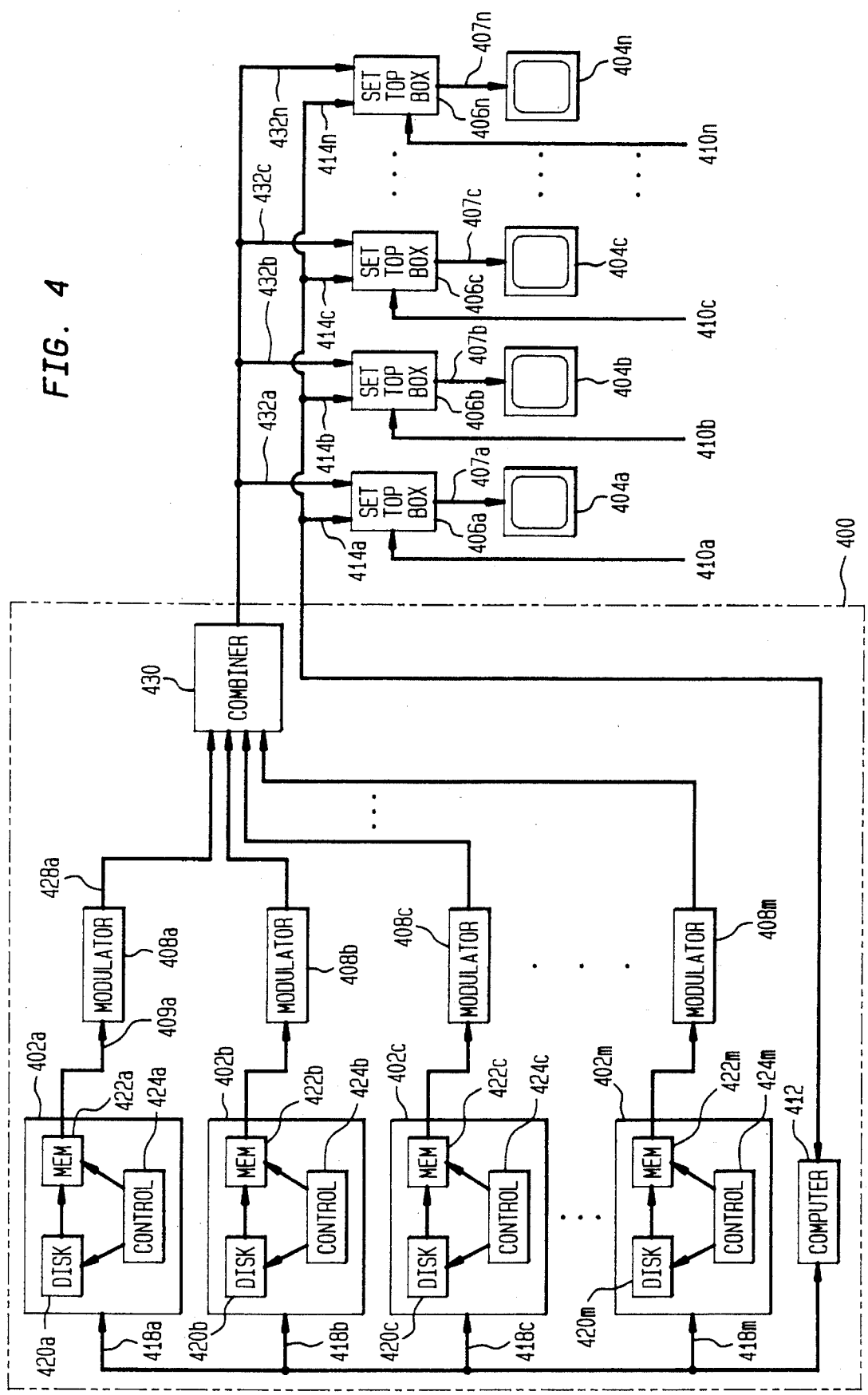
FIG. 4 is a block-schematic diagram of a video on demand system incorporating the present invention.

A preferred embodiment of the present invention is shown in FIG. 4. The figure depicts a video transmission center 400 housing a video on demand system that utilizes m video feeds, or "paths", to supply n viewers. Each video feed includes a modulator (modulators 408a–4408m) and a video playback device (video playback devices 402a–402m) having a disk drive (disk drives 420a–420m), a random access memory (RAM) (RAMs 422a–422m), and a controller (controllers 424a–424m). Each viewer is equipped with a television set (television sets 404a–404n) and a set top box (set top boxes 406a–406n). It will be understood by one of ordinary skill in the art that the set top box may be incorporated into the television set so that the functions of the set top box and the television set are performed by a single unit; and, in the alternative, that a computer and associated monitor may be substituted for the set top box and television set.

In any event, the rate of playback is varied from feed to feed and viewers requesting a movie are coupled to the feed that most facilitates "clumping". Viewer requests 410a–410n are made through the set top boxes that are supplied for use with the system. Two ways in which a viewer may make a request are: through a remote control associated with the viewer's set top box, and through buttons located on the box itself. The requests are relayed to the computer 412 via communication couplings 414a–414n. These communication couplings may take the form of a shared packet-switched coupling that provides n separate communication paths on one or more communication lines. The communication line (or lines), and all other communication lines hereinafter discussed, may take the physical form of a twisted shielded pair line, fiber optic line, a coaxial cable, a wireless link, or any other form suitable for electronic communication.

Based on the time and nature of a viewer request, the computer sends a signal back to that viewer's set top box (via one of couplings 414a–414n), in response to which the set top box switches the viewer to the appropriate feed. The computer may base its switching decisions on any one of the aforementioned clumping algorithms.

In addition to switching viewers, computer 412 monitors and controls video playback devices 402a–402m via communication couplings 418a–418m. These couplings, like couplings 414a–414n, may take the form of a shared packet switched coupling, in this case providing m separate communication paths. Software in the computer may used to select the movie to be played at each playback device and to select the rate of playback at each playback device.

As an illustration of how a movie is delivered from one of the video playback devices to one of the viewer television sets, the path from video playback device 402a to viewer television set 404a, will be described in detail. The illustration will enable those of ordinary skill in the art to fully understand the operation of the other video paths.

A movie to be played by video playback device 402a is stored in digital form on disk drive 420a. In response to a signal from computer 412, controller 424a directs the disk drive to download sequential portions of the stored movie into RAM 422a. These portions are read from the RAM, either in whole or in part, by modulator 408a over coupling 409a. The modulator converts the digital output of the RAM into a Radio Frequency (RF) signal that is suitable for transmission to television set 404a. The RF output of modulator 408a is then passed to an RF combiner 430 via coupling 428a where it is combined with RF outputs from modulators 408b–408m to form a combined RF signal. It is this combined RF signal that is delivered to set top box 406a via coupling 432a, as well as to set top boxes 406b–406n via couplings 432b–432n, respectively.

Different carrier frequencies are used by each modulator 498a–408m to enable the set top boxes to switch viewers between the m playback paths. Thus, to switch a viewer to the path associated with a particular playback device, the viewer's set top box is tuned to the carrier frequency associated with that playback device. For example, to switch viewer set 404a from the output of video playback device 402a to the output of device 402c, set top box 402a is tuned from the carrier frequency associated with modulator 408a to the carrier frequency associated with modulator 408c. In practice, each set top box 406a–406n is tuned to one of the playback devices and the signals associated with those playback devices are passed to viewer sets 404a–404n via couplings 407a–407n, respectively.

I claim:

1. A method of providing programming on demand service, comprising the steps of:

coupling a first subscriber who requests a program at a given time to a first program feed which plays said program at a first feed rate;

coupling a second subscriber who requests said program at a different time from said first subscriber to a second program feed which plays said program at a second feed rate, said second feed rate differing from said first feed rate;

grouping said first subscriber and said second subscriber into a first group when said subscribers progress to the same point within said program; and coupling said first group to a first group feed so that said first subscriber and said second subscriber receive the remainder of said program on said group feed, said first group feed being selected from one of said program feeds.

2. A method of providing programming on demand service according to claim 1, wherein the step of coupling a first subscriber comprises the steps of:

lengthening a program;

storing said lengthened program on a medium suitable for use in a first playback device;

providing the first feed, said first feed including said first playback device and a first path for coupling the first subscriber to said first playback device;

transmitting said program to said first subscriber via said first feed; and wherein the step of coupling a second subscriber comprises the steps of: shortening said program;

storing said shortened program on a medium suitable for use in a second playback device;

providing the second feed, said second feed including said second playback device and a second path for coupling the second subscriber to said second playback device; and transmitting said program to said second subscriber via said second feed.

3. A method of providing programming on demand service according to claim 1, further comprising the steps of:

providing a pause option for allowing said subscribers to pause said program;

providing a resume option for allowing said subscribers to resume said paused program; and coupling a resuming subscriber to one of said feeds.

4. A method of providing programming on demand service according to claim 3, wherein said step of coupling a resuming subscriber to one of said feeds comprises the steps of:

determining a resumption feed, said resumption feed being chosen from said feeds so that the amount of time elapsing before said resuming subscriber is grouped with a subscriber who is not paused is minimized; and coupling said resuming subscriber to said resumption feed.

5. A method of providing programming on demand service according to claim 2, wherein said program is a movie and said step of lengthening said program comprises the steps of:

generating a new sequence of movie frames by interpolating a sequence of original movie frames, said new sequence of frames being greater in number than said sequence of original frames;

substituting said new sequence of frames for said sequence of original frames within said movie; and wherein said step of shortening said program comprises the steps of:

generating a new sequence of movie frames by interpolating a sequence of original movie frames, said new sequence of frames being shorter in number than said sequence of original frames; and substituting said new sequence of frames for said sequence of original frames within said movie.

6. A method of providing programming on demand service according to claim 2, wherein said program is a movie and said step of lengthening said movie comprises the steps of:

identifying scene change intervals occurring within the movie;

duplicating movie frames occurring at or near said scene change intervals; and wherein said step of shortening said movie comprises the steps of:

identifying scene change intervals occurring within said movie; and trimming movie frames occurring at or near said scene change intervals.

7. A method of providing programming on demand service according to claim 2, wherein said program is an audio program and said step of lengthening said program comprises the step of repeating one or more sections of said audio program; and wherein said step of shortening said program comprises the step of deleting one or more sections of said audio program.

8. A method of providing programming on demand service according to claim 2, wherein said program is an audio program and said step of lengthening said program comprises the step of speeding up playback of one or more sections of said audio program; and wherein said step of shortening said program comprises the step of slowing down playback of one or more sections of said audio program.

9. A method of providing programming on demand service according to claim 1, further comprising the steps of:

coupling a third subscriber to a third program feed which plays said program at a third feed rate;

grouping said third subscriber and said first group into a second group whenever said third subscriber and said first group progress to the same point within said program; and coupling said second group to a second group feed so that said third subscriber and said first group receive the remainder of said program on said second group feed, said second group feed being selected from one of said program feeds.

10. A method of providing programming on demand service according to claim 1, further comprising the steps of providing an unaltered program feed by setting one of said feed rates to the rate at which the program is normally played;

and wherein the step of coupling said first group comprises the step of:

coupling said first group to said unaltered feed so that said first subscriber and said second subscriber receive the remainder of said program on said unaltered program feed.

11. A method of providing programming on demand service according to claim 9, further comprising the steps of providing an unaltered program feed by setting one of said feed rates to the rate at which the program is normally played;

and wherein the step of coupling said second group comprises the step of:

coupling said second group to said unaltered feed so that said third subscriber and said first group receive the remainder of said program on said unaltered program feed.

* * * * *